(12) United States Patent
Fitzpatrick et al.

(10) Patent No.: US 8,116,590 B2
(45) Date of Patent: *Feb. 14, 2012

(54) ONLINE IMAGE PROCESSING METHODS UTILIZING USER'S SATISFACTION LOOP

(75) Inventors: Shawn Michael Fitzpatrick, Phoenix, AZ (US); Stacey Lynn Christiansen, Delhi, IA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 484 days.

This patent is subject to a terminal disclaimer.

(21) Appl. No.: 12/417,562

(22) Filed: Apr. 2, 2009

(65) Prior Publication Data

US 2009/0195558 A1 Aug. 6, 2009

Related U.S. Application Data

(62) Division of application No. 11/307,825, filed on Feb. 24, 2006, now Pat. No. 7,778,486.

(51) Int. Cl.
*G06K 9/36* (2006.01)

(52) U.S. Cl. ...................................................... 382/284

(58) Field of Classification Search .................. 382/284; 430/15

See application file for complete search history.

(56) References Cited

U.S. PATENT DOCUMENTS

| 7,894,690 B2 * | 2/2011 | Fitzpatrick et al. ........... 382/284 |
| 2002/0049847 A1 * | 4/2002 | McArdle et al. ............... 709/227 |
| 2005/0050002 A1 * | 3/2005 | Slotznick ......................... 707/1 |
| 2006/0031091 A1 * | 2/2006 | Tarr et al. ......................... 705/1 |

* cited by examiner

*Primary Examiner* — Gregory F Cunningham
(74) *Attorney, Agent, or Firm* — Sergey G. Zaytsev

(57) ABSTRACT

The present invention allows for online image processing. A sample embodiment of the method comprises the steps of determining graphical layers (predetermined graphical layers) and steps (predetermined steps) for creating an image. A substitute layer maybe obtained from a remote User. The predetermined steps may be repeated using predetermined graphical layers and the substitute layer, thus, creating a new image. The image may be further delivered to the User. If the User is not satisfied, the graphical layers or steps may be changed and method repeated. Described systems and methods may allow users to create complex digital images using remote servers, without the use of graphical tools on the user's computer. Even users without substantial technical or artistic skills may create complex digital images.

8 Claims, 18 Drawing Sheets

FIG. 7C

This section was originally published in 1996 and if you are new to Web design, provides a good primer for the basic techniques and principles involved in designing and building Web pages.

The Web is changing very quickly. If you want to learn more about the lastest techniques, check out the more recent articles in the editorials menu.

FIG. 7D

Design Menu

This section was originally published in 1996 and if you are new to Web design, provides a good primer for the basic techniques and principles involved in designing and building Web pages.

The Web is changing very quickly. If you want to learn more about the lastest techniques, check out the more recent articles in the editorials menu.

FIG. 7E

Introduction

This section contains a general introduction to this site and its author.

This section contains editorials back to January 2000 are listed here. There is also a list of earlier editorials.

FIG. 7F

Introduction

This section contains a general introduction to this site and its author.

This section contains editorials back to January 2000 are listed here. There is also a list of earlier editorials.

FIG. 7G

Design Menu

Introduction
This section contains a general introduction to this site and its author.

This section contains editorials back to January 2000 are listed here. There is also a list of earlier editorials.

FIG. 7H

ONLINE IMAGE PROCESSING METHODS UTILIZING USER'S SATISFACTION LOOP

CROSS REFERENCE TO RELATED PATENT APPLICATIONS

The present application is a divisional of U.S. patent application Ser. No. 11/307,825, titled "Online Image Processing Systems and Methods," filed Feb. 24, 2006 and issued as U.S. Pat. No. 7,778,486 on Aug. 17, 2010.

This patent application is also related to the following patent applications, all assigned to The Go Daddy Group, Inc:

U.S. patent application Ser. No. 12/417,564, titled "Online Image Processing Systems and Methods Utilizing Image Processing Parameters," filed Apr. 2, 2009, which is a divisional of U.S. patent application Ser. No. 11/307,825.

U.S. patent application Ser. No. 12/417,561, titled "Online Image Processing Methods Utilizing Image Processing Parameters and User's Satisfaction Loop," filed Apr. 2, 2009 and issued as U.S. Pat. No. 7,894,690 on Feb. 22, 2011, which is a divisional of U.S. patent application Ser. No. 11/307,825.

FIELD OF THE INVENTION

The present invention relates in general to systems and methods for server-side image processing and in particular to systems and methods for repeating a predetermined set of steps for creating an image on a remote server.

BACKGROUND OF THE INVENTION

Digital images are a common form of data in modern society. Use of digital photography is spreading rapidly among professional and amateur photographers. The use of traditional (film) photography is declining. The quality of digital photography is constantly improving. Digital images may be stored practically forever without reduction in image quality. Prices for equipment to take, store, and print high resolution digital images are rapidly declining. As a result of this sweeping transformation to digital photography, some camera makers have stopped producing traditional cameras.

An additional reason for the extensive use of digital images is the tremendous growth of the Internet. Images on the Internet may be saved and displayed only in a digital form. There are many millions, perhaps billions, of images on the Internet.

Additional advantages of digital photography lie with easy manipulation (editing, processing) of the images. Digital image processing has become a significant form of image processing because of continuing improvements in techniques and increasingly powerful hardware devices. Digital image processing techniques have augmented and, in some cases, replaced methods used by photographers in image composition and dark room processing. For example, digital image processing techniques such as contrast balancing, edge sharpening, color balancing or retouching of defects are employed for editing original photographic images. Moreover, with the aid of a computer, digitized images can be edited to achieve a variety of effects, which are hard or impossible to achieve with traditional photography, such as changing the shapes and colors of objects and forming composite images.

Until recently, real-time editing of digital graphic images was feasible only on expensive high-performance workstations with dedicated, special-purpose, hardware. The progress of integrated circuit technology in recent years has produced microprocessors with significantly improved processing power and has also reduced the costs of computer memories. These developments have made it feasible to implement advanced graphic editing techniques in personal computers. These editing techniques, however, are typically complex and require a technical and/or artistic expertise beyond that of ordinary users of personal computers.

For example, image compositing is a digital image processing technique that merges unrelated objects from multiple images. The result is a new scene that may never have existed physically. Image compositing has gained widespread use in photography. Image compositing operations, however, typically require a complex procedure for compositing the various images in order to achieve the desired effect. Thus, although the standard PC of today is capable of implementing these complex procedures, the average user is not.

Software for performing various image processing operations can be very expensive. Also, advanced graphical packages can be hard to learn and use. Creation of a complex digital image may require substantial technical or artistic skills. Thus, there is a need for digital imaging processing systems and methods, which may produce desired digital images in a cost-effective and timely manner, without requiring either technical or artistic skills from the user.

BRIEF DESCRIPTION OF THE DRAWINGS

FIGS. 6A-H, 7A-H, and 8A-H are sample illustrations that demonstrate how images may change by using the methods of the present invention.

DETAILED DESCRIPTION AND PREFERRED EMBODIMENT

Figure 1:
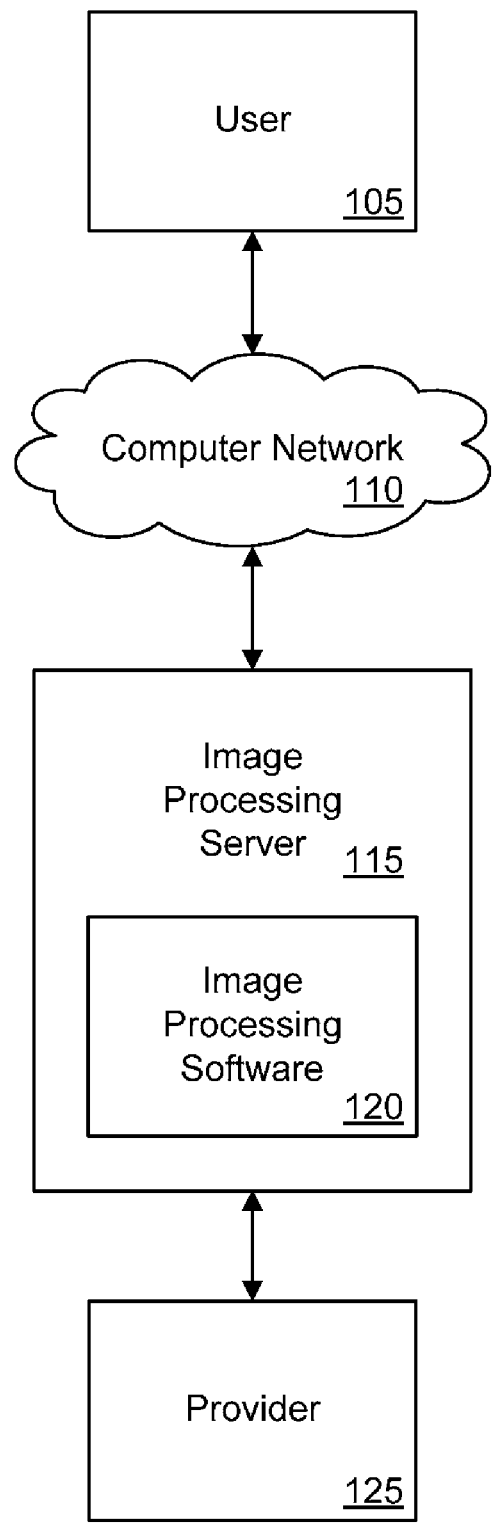
FIG. 1 is a block diagram illustrating a sample embodiment of the system of the present invention.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

For the purposes of this patent application online image editing and server-side image editing are considered synonymous.

A sample system of the present invention is illustrated in FIG. 1. The system may comprise a User 105, who has ability to Connect to an Image Processing Server 115 via a Computer Network 110. The Computer Network 110 may be a global computer network, such as the Internet.

An Image Processing Software 120 may reside on the Image Processing Server 115. The Image Processing Software 120 has the ability to repeat (perform, execute) one or more predetermined image processing steps using one or more predetermined graphical layers. The steps and layers are predetermined by a Provider 125. The graphical layers may include images, text, formatted text, graphical effects, etc. The User 105 has the ability to add, modify, or remove one or more steps or graphical layers.

The User 105 may interface with the Image Processing Server 115 through a website maintained by the Provider 125.

In an alternative embodiment the Image Processing Server 115 and the Image Processing Software 120 may be replaced with an Image Processing Means. The Image Processing Means may be one or more computers, devices, circuitry, and/or hardware, or equivalents thereof, programmed with logical instructions, for repeating one or more predetermined sets of image processing steps, wherein at least one graphical layer or step is added, modified, or removed.

Figure 2:
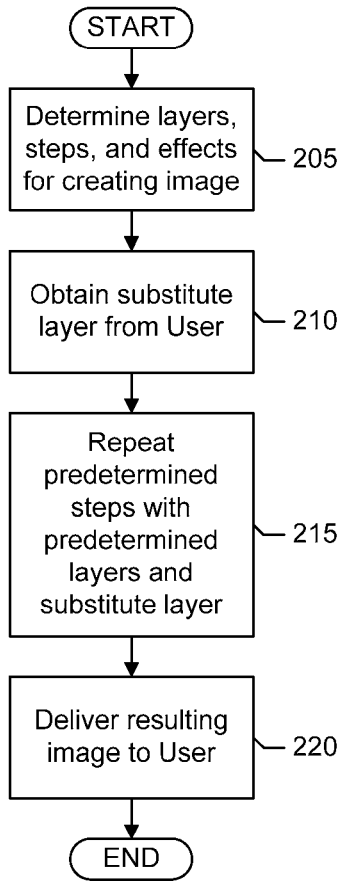
FIGS. 2-5 are flowcharts illustrating sample embodiments of the methods of the present invention.

A sample method for online image processing is shown in FIG. 2. The Provider 125 may determine one or more graphical layers and steps for creating an image (Step 205). The graphical layers may include images, text, formatted text, graphical effects, etc. The image may be, for example, a raster (bitmap) image or a vector image. The Image Processing Server 115 may obtain a substitute layer from the User 105 (Step 210). The substitute layer may be a User's graphical file.

The Image Processing Software 120, residing on the Image Processing Server 115, may repeat predetermined steps using predetermined graphical layers and the substitute layer (Step 215). This will produce a new image that incorporates the substitute layer. The Image Processing Server 115 may then deliver the new image to the User 105 (Step 220).

The image processing steps may include a step of combining the images (layers) or applying an effect to one or more layers. Combining the images may create a new image, wherein transparent elements of an upper image are replaced with the elements of an underlying image. In a preferred embodiment, the resulting image is achieved by combining all the layers into a single image (so called, "flattening" the image).

Figure 6A:
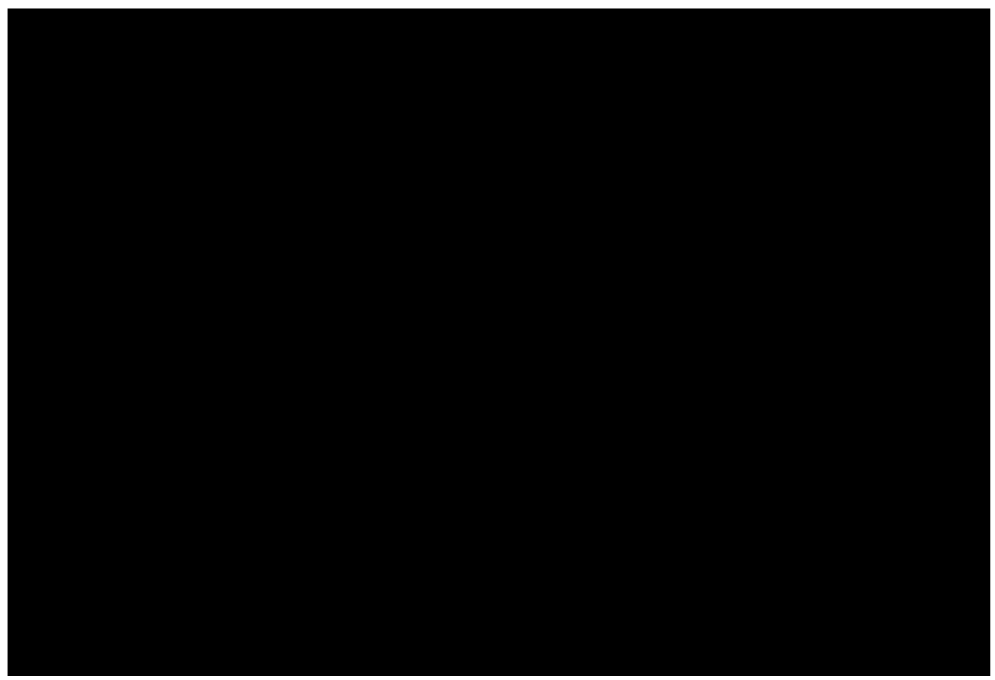
Figure 6B:
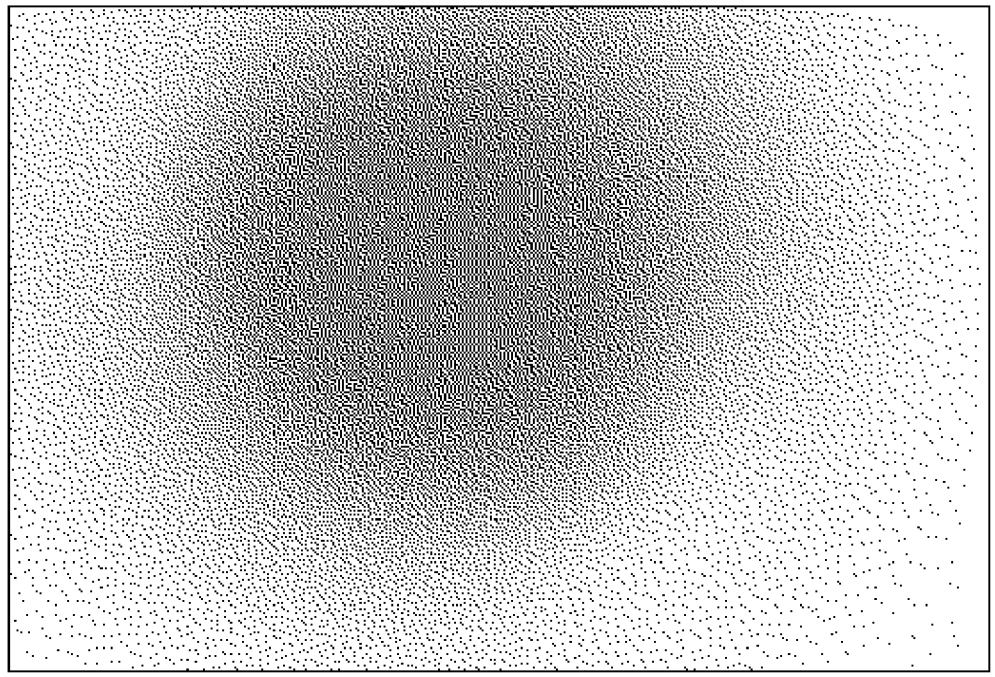
Figure 6C:
Figure 6D:
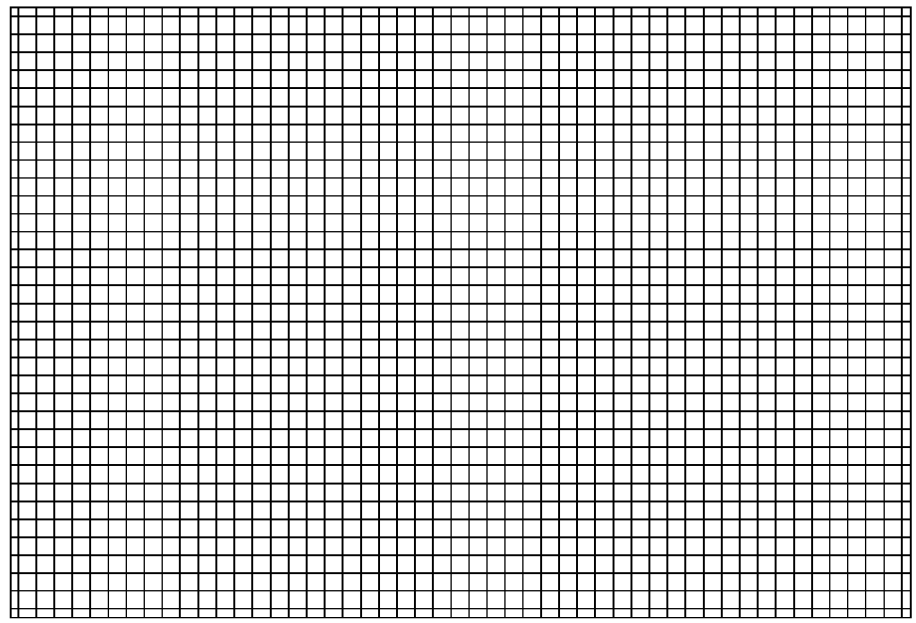
Figure 6E:
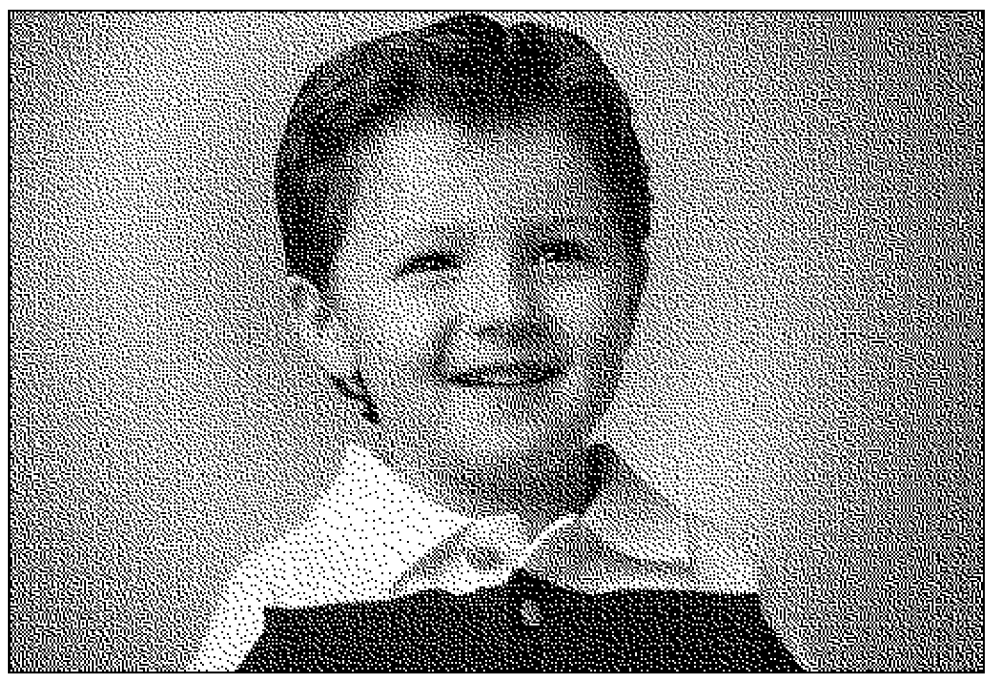

FIGS. 6A-H may be used to illustrate this with example. FIGS. 6A-D represent a set of predetermined layers for creating an image shown at FIG. 6E. FIG. 6A is the first layer representing a background image of a solid color, such as green, blue, red, etc. FIG. 6B is the second layer representing an effect that will be applied to the background image to achieve a glowing effect. FIG. 6C is the third layer representing an image that will be placed over the background image with the glowing effect. FIG. 6D is the fourth layer representing an effect that will be applied to the image to achieve a grid effect. FIG. 6E is a resulting image, achieved by combining layers at FIGS. 6A-D. Images and effects shown at FIGS. 6A-D represent predetermined layers and steps for producing the resulting image.

The grid effect in the resulting image is not very well noticeable due to the fact that the image was further dithered to true black and white for patent publication. In a preferred embodiment, the layers may comprise color, grayscale, and true (1-bit) black and white elements.

Figure 6F:
Figure 6G:
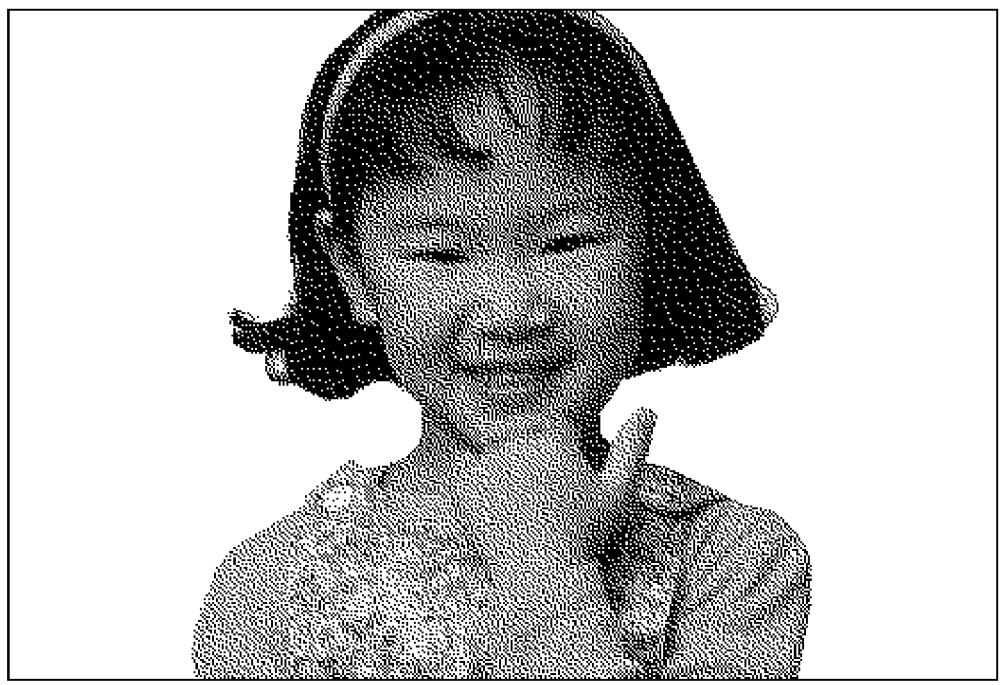
Figure 6H:
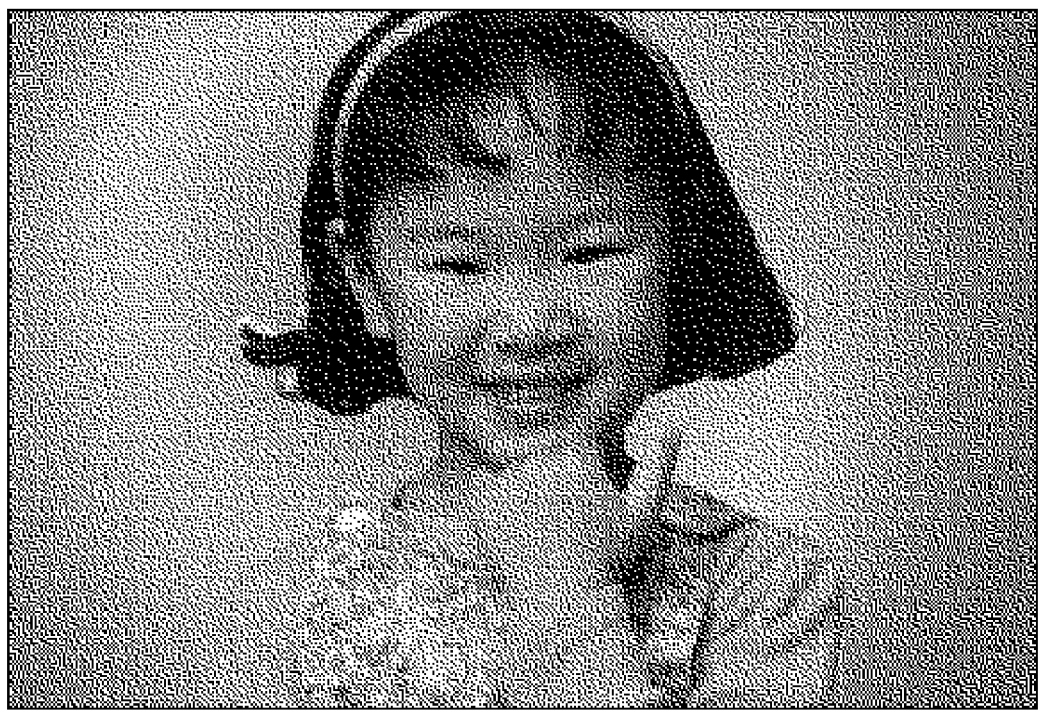

Further, the User 105 may supply the Image Processing Software 120 with a substitute layer shown FIG. 6F (a substitute image). The Image Processing Software 120 may remove the background in the substitute image as shown in FIG. 6G. Alternatively, the User 105 may remove the background in the substitute image (FIG. 6G) before supplying the substitute image to the Image Processing Software 120. Optionally, the Image Processing Software 120 may position (x and y axis) the substitute image on the resulting image (e.g. center it, as shown in FIG. 6G).

In the present example, the image at FIG. 6C is substituted by the image at FIG. 6G. In a more general scenario, the User 105 may specify which layers should be replaced. Repeating the predetermined steps using the substitute image, results in a new image shown at FIG. 6H. This allows the User 105 to create complex images without substantial technical or artistic skills.

Figure 7A:
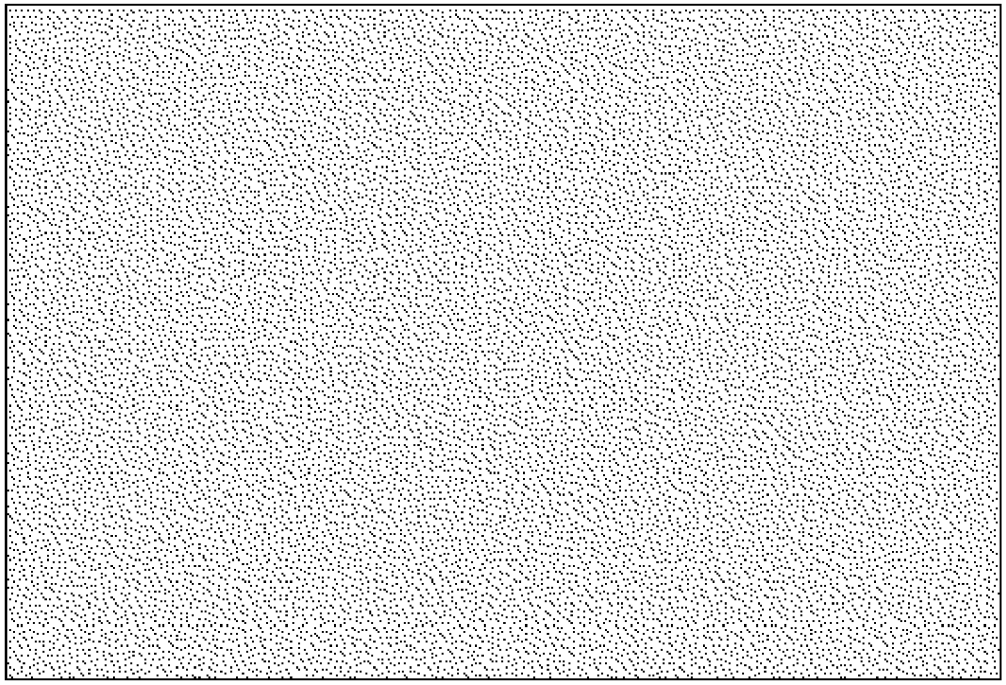
Figure 7B:
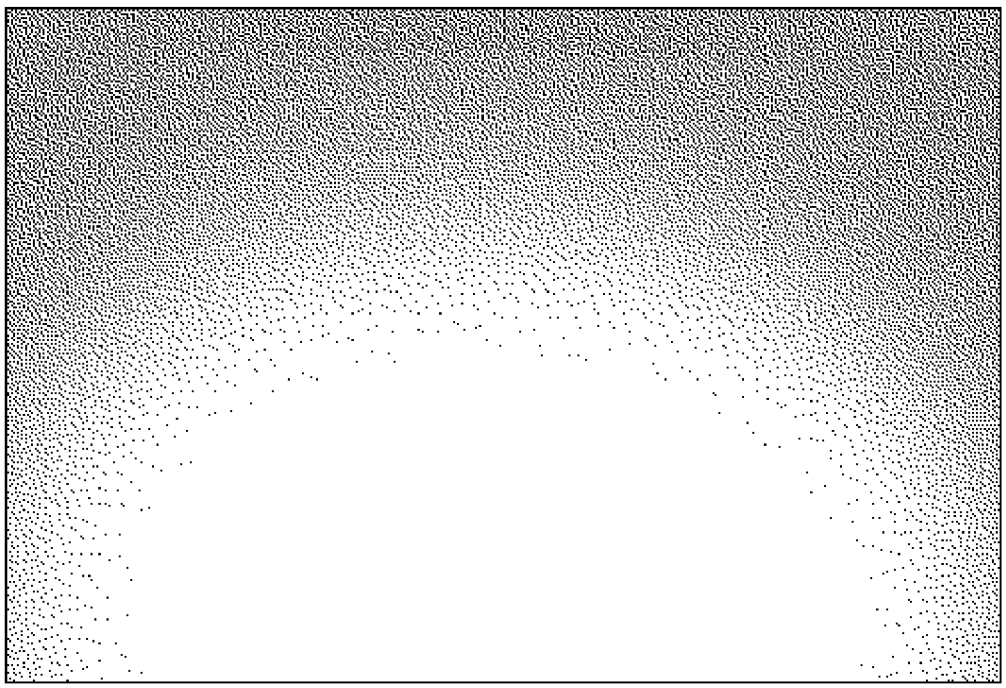

In the example shown at FIGS. 7A-H, at least one of the predetermined layers comprises a formatted text, which further may be replaced with a substitute text. FIGS. 7A-D represent a set of predetermined layers for creating an image shown at FIG. 7E. FIG. 7A is the first layer representing a background image. FIG. 7B is the second layer representing an effect that will be applied to the background image to achieve a half-circle fading effect. FIG. 7C is the third layer representing a first formatted text that will be placed over the background image with the fading effect. FIG. 7D is the fourth layer representing a second formatted text. FIG. 7E is a resulting image, achieved by combining layers at FIGS. 7A-D. Images, effects, and text shown at FIGS. 7A-D represent predetermined layers and steps for producing the resulting image.

Further, the User 105 may supply the Image Processing Software 120 with a substitute layer shown at FIG. 7F (a substitute text). The Image Processing Software 120 may remove the background in the substitute text as shown in FIG. 7G. Alternatively, the User 105 may remove the background from the substitute text (FIG. 7G) before supplying the substitute text to the Image Processing Software 120. Optionally, the Image Processing Software 120 may position (x and y axis) the substitute text on the resulting image.

In this example, the text at FIG. 7D is substituted by the text at FIG. 7G. In a more general scenario, the User 105 may specify which layers should be replaced. Repeating the predetermined steps using the substitute text, results in a new image shown at FIG. 7H.

Alternatively, the User 105 may add one or more new layers to the set of predetermined layers or/and remove one or more existing layers from the set of predetermined layers.

Figure 3:
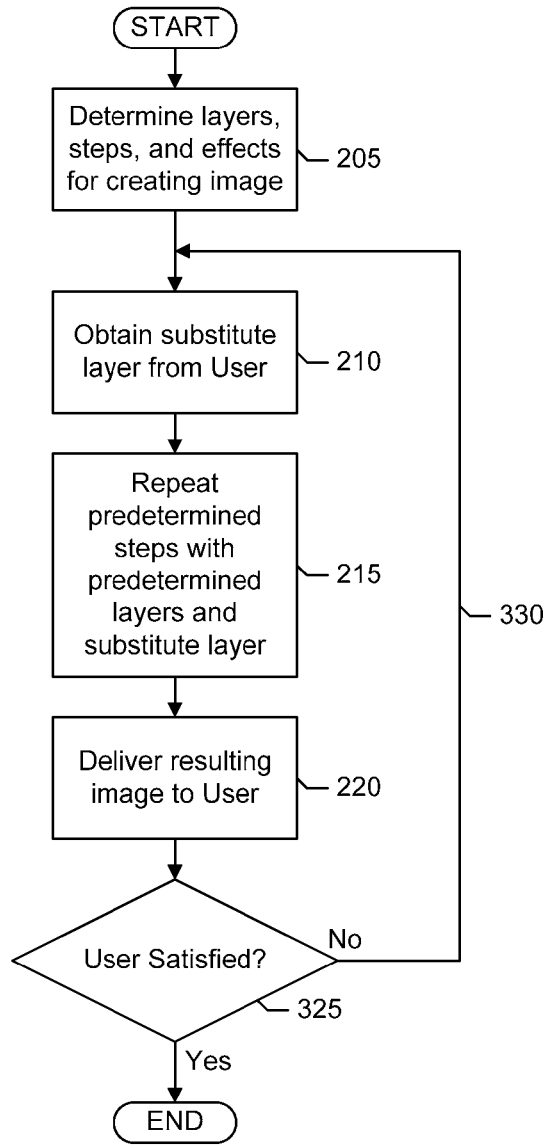

In an alternative sample embodiment shown in FIG. 3, the Provider 125 may determine one or more graphical layers and steps for creating an image (Step 205). The Image Processing Server 115 may obtain a substitute layer from the User 105 (Step 210). The Image Processing Software 120, residing on the Image Processing Server 115, may repeat predetermined steps using predetermined graphical layers and the substitute layer (Step 215). This will produce a new image that incorporates the substitute layer. The Image Processing Server 115 may then deliver the new image to the User 105 (Step 220). If the User 105 is not satisfied with the new image (Step 325), the method may be repeated starting at Step 210 (Step 330). If the User 105 is satisfied, the method ends.

When the method is repeated starting at Step 210, the User 105 may provide a new substitute layer for the previously selected predetermined layer or for another predetermined layer. Thus, the User 105 may either adjust the resulting image by supplying the substitute layer for the previously selected predetermined layer, or create iterations of resulting image by replacing various predetermined layers.

Alternatively, the User 105 may add one or more new layers to the set of predetermined layers or/and remove one or more existing layers from the set of predetermined layers.

Figure 4:
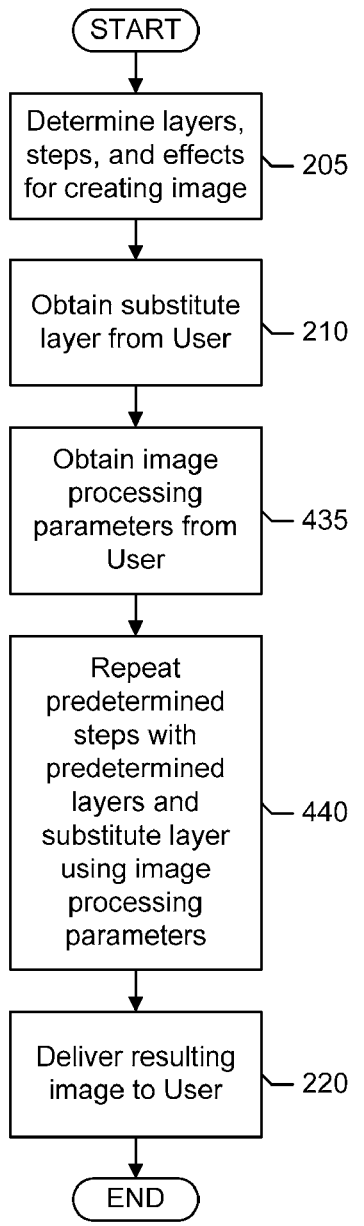

Referring to a sample method shown in FIG. 4, the Provider 125 may determine one or more graphical layers and steps for creating an image (Step 205). The Image Processing Server 115 may obtain a substitute layer from the User 105 (Step 210). Further, the Image Processing Server 115 may obtain one or more image processing parameters from the User 105 (Step 435). The image processing parameters may include layer location (position), intensity, brightness, sharpness, color, graphical effects, order of applying layers or/and graphical effects, and others.

The Image Processing Software 120 may repeat predetermined steps with predetermined graphical layers and the substitute layer using the image processing parameters obtained from the User 105 (Step 440). This will produce a new image that incorporates the substitute layer and the image processing parameters. The Image Processing Server 115 may then deliver the new image to the User 105 (Step 220).

The graphical effects may include layer trimming, resizing, scaling, color balancing, texturing, and others.

Figure 5:
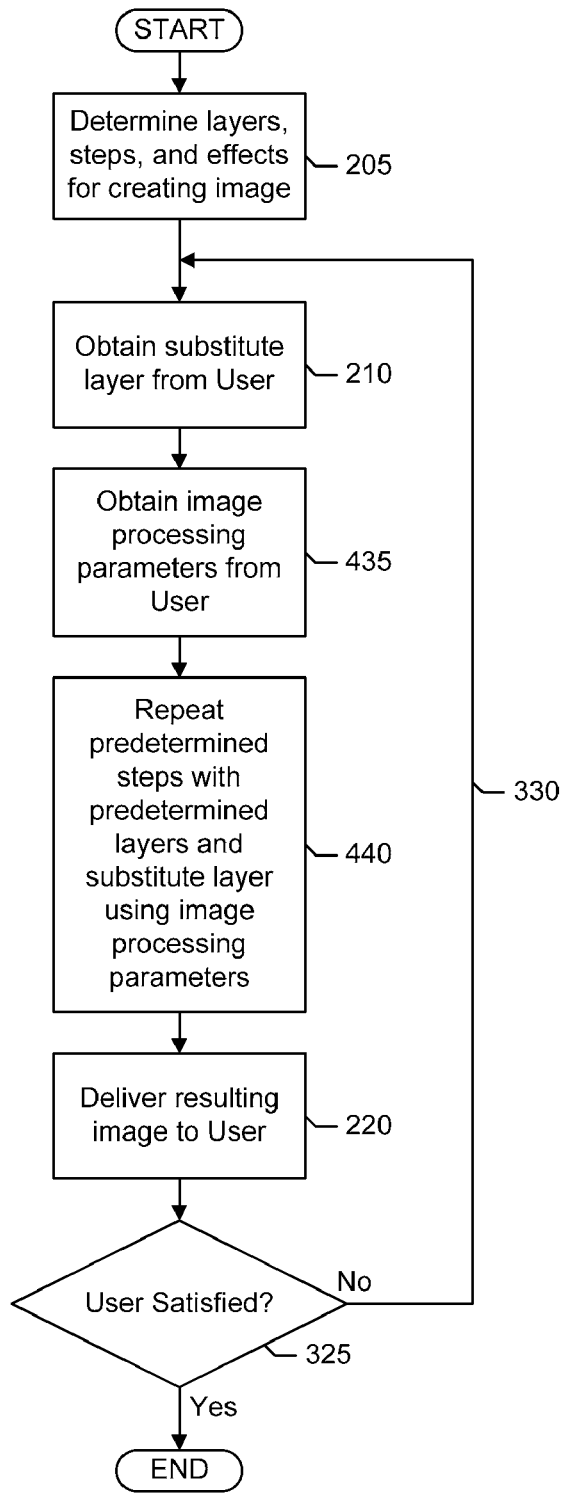

Alternatively, as shown in FIG. 5, the Provider 125 may determine one or more graphical layers and steps for creating an image (Step 205). The Image Processing Server 115 may obtain a substitute layer from the User 105 (Step 210). Further, the Image Processing Server 115 may obtain one or more image processing parameters from the User 105 (Step 435). The When the method is repeated starting at Step 210, the User 105 may provide a new substitute layer for the previously selected predetermined layer or for another predetermined layer, as well as change and/or add image processing parameters. Thus, the User 105 may either (a) adjust the resulting image by supplying a substitute layer for a previously selected predetermined layer or changing parameters, or (b) create iterations of the resulting image by replacing various predetermined layers and/or adding new parameters.

Figure 8A:
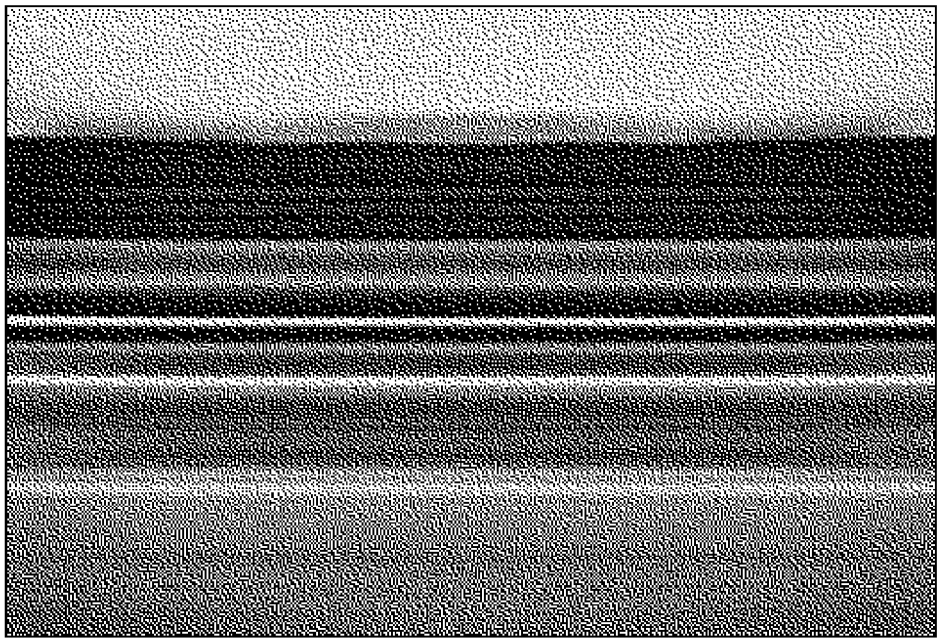
Figure 8B:
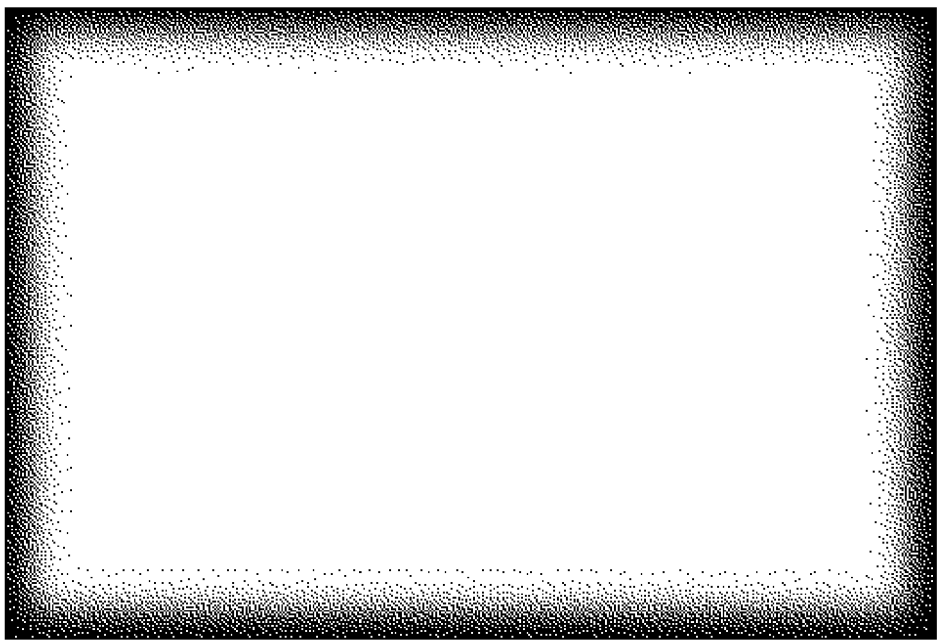
Figure 8C:
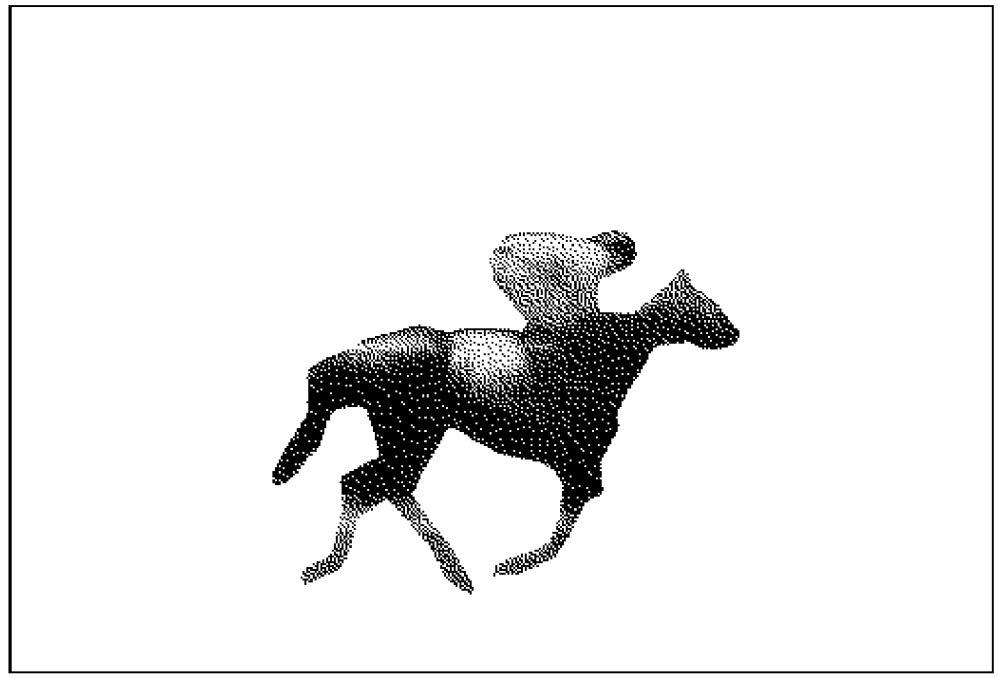
Figure 8D:
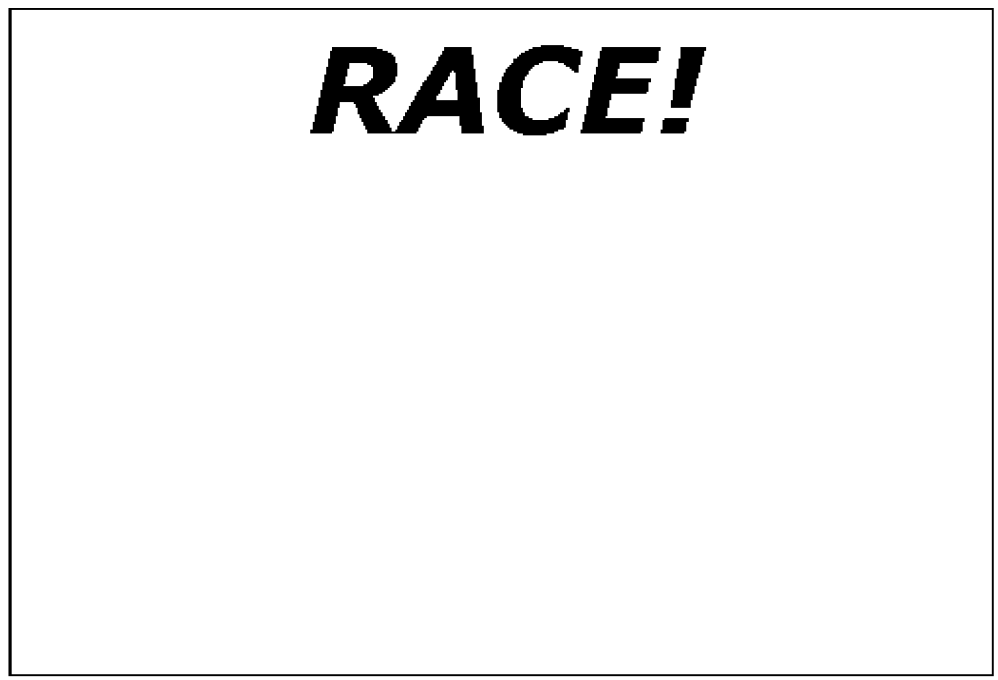
Figure 8E:

FIGS. 8A-H may be used to illustrate this with example. FIGS. 8A-D represent a set of predetermined layers for creating an image shown at FIG. 8E. FIG. 8A is the first layer representing a background image. FIG. 8B is the second layer representing an effect that will be applied to the background image to achieve a fading frame effect. FIG. 8C is the third layer representing an image that will be placed over the background image with the frame effect. FIG. 8D is the fourth layer representing a formatted text that will be added to the image. FIG. 8E is a resulting image, achieved by combining layers at FIGS. 8A-D. Images, effects, and text shown at FIGS. 8A-D represent predetermined layers and steps for producing the resulting image.

Figure 8F:
Figure 8G:
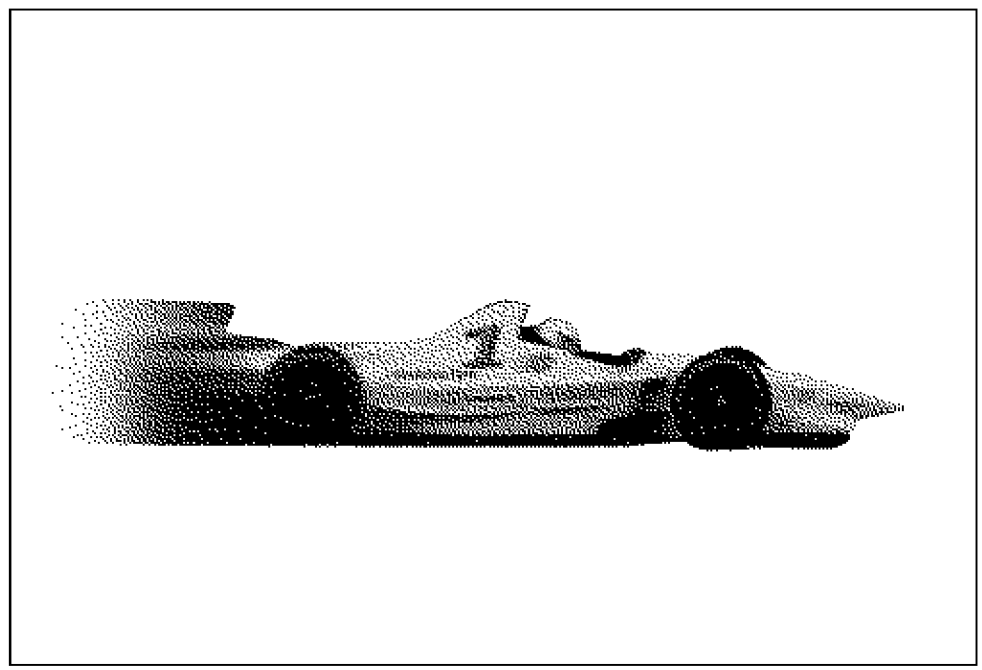
Figure 8H:

Further, the User 105 may supply the Image Processing Software 120 with a substitute layer shown at FIG. 8F (a substitute image). The Image Processing Software 120 may remove the background in the substitute image as shown in FIG. 8G. Alternatively, the User 105 may remove background in the substitute image (FIG. 8G) before supplying the substitute image to the Image Processing Software 120. Further, the User 105 may supply the Image Processing Software 120 with image processing parameters, such as the position (x and y axis) of the substitute image on the resulting image. The Image Processing Software 120 may create a new image using the substitute image and image processing parameters and deliver the new image to the User 105. If the User 105 is not satisfied with the resulting image or if the User 105 wants to replace additional layers or change/add some effects, the User 105 may resubmit substitute layers and processing parameters to the Image Processing Software 120.

The described systems and methods may allow users to create complex digital images using remote servers, without the use of graphical tools on the user's computer. Even users without substantial technical or artistic skills may create complex digital images.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention. The elements, steps, and limitations recited in the specification must not be read into the claims.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. An online image processing method, comprising the steps of:
   a) determining one or more graphical layers, thereby creating predetermined graphical layers, and determining image processing steps, thereby creating predetermined image processing steps, for creating a first image,
   b) obtaining a substitute layer from a remote User, wherein said substitute layer replaces at least one of said predetermined graphical layers,
   c) performing said predetermined image processing steps using remaining said predetermined graphical layers and said substitute layer, thereby, creating a second image,
   d) delivering said second image to said remote User,
   e) determining if said remote User is satisfied with said second image, and
   f) if said remote User is not satisfied with said second image, then repeating steps b)-f).

2. The method of claim 1, wherein at least one of said predetermined graphical layers comprises an image, a text, a formatted text, or a graphical effect.

3. The method of claim 1, wherein said substitute layers comprises an image, a text, a formatted text, or a graphical effect.

4. The method of claim 1, further comprising a step of:
   removing at least one of said predetermined graphical layers before step e).

5. The method of claim 1, further comprising a step of:
   adding a new graphical layers before step e).

6. The method of claim 1, further comprising a step of:
   removing at least one of said predetermined image processing steps before step e).

7. The method of claim 1, further comprising a step of:
   adding a new image processing step before step e).

8. The method of claim 1, further comprising a step of:
   changing sequential order of at least two of said predetermined image processing steps before step e).

* * * * *